United States Patent
Cheon et al.

(10) Patent No.: US 8,173,288 B2
(45) Date of Patent: May 8, 2012

(54) SECONDARY BATTERY

(75) Inventors: Sang-Eun Cheon, Suwon-si (KR);
Jae-Kyung Kim, Suwon-si (KR);
Seok-Yoon Yoo, Suwon-si (KR);
Hye-Won Yoon, Suwon-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 1771 days.

(21) Appl. No.: 11/212,768

(22) Filed: Aug. 29, 2005

(65) Prior Publication Data
US 2006/0063068 A1  Mar. 23, 2006

(30) Foreign Application Priority Data
Sep. 21, 2004  (KR) .................. 10-2004-0075404

(51) Int. Cl.
*H01M 6/10* (2006.01)
*H01M 2/26* (2006.01)
*H01M 2/00* (2006.01)
*H01M 2/02* (2006.01)

(52) U.S. Cl. .............. 429/94; 429/161; 429/163

(58) Field of Classification Search .......... 429/94, 429/211, 161, 163
See application file for complete search history.

(56) References Cited

U.S. PATENT DOCUMENTS

| | | | | |
|---|---|---|---|---|
| 6,335,114 | B1* | 1/2002 | Ueshima et al. | 429/94 |
| 7,501,201 | B2* | 3/2009 | Ishikawa et al. | 429/162 |
| 2004/0191612 | A1* | 9/2004 | Akita et al. | 429/94 |

FOREIGN PATENT DOCUMENTS

| | | |
|---|---|---|
| JP | H09-147830 | 6/1997 |
| JP | 2000-150306 | 5/2000 |
| JP | 2001-038475 | 2/2001 |
| JP | 2002-056904 | 2/2002 |
| JP | 2003-249419 | 9/2003 |
| JP | 2004-303500 | 10/2004 |

\* cited by examiner

Primary Examiner — Helen O Conley
(74) Attorney, Agent, or Firm — Robert E. Bushnell, Esq.

(57) ABSTRACT

A secondary battery includes an electrode assembly including a positive electrode, a negative electrode, and a separator interposed between the positive and negative electrodes, a case for housing the electrode assembly, a cap assembly to be attached to the case for sealing the case and to have a terminal exposed outside the case, and a lead element which electrically connects the electrode assembly to the terminal. The electrode assembly includes an uncoated region where an active material is not present and the lead element has a configuration corresponding to that of the uncoated region and is closely affixed to the uncoated region.

13 Claims, 5 Drawing Sheets

SECONDARY BATTERY

CLAIM OF PRIORITY

This application makes reference to, incorporates the same herein, and claims all benefits accruing under 35 U.S.C. §119 from an application for SECONDARY BATTERY earlier filed in the Korean Intellectual Property Office on 21 Sep. 2004 and there duly assigned Serial No. 10-2004-0075404.

BACKGROUND OF THE INVENTION

1. Field of the Invention

The present invention relates to a secondary battery. More particularly, it relates to a structure connecting an electrode assembly with lead elements.

2. Description of the Related Art

A secondary battery can be charged and discharged unlike a primary battery which is incapable of being recharged. A low capacity battery that has only one battery cell is packaged into a pack shape and can be used as a power source for various portable small electronic devices such as cellular phones, laptop computers, and camcorders. A high capacity secondary battery that has several tens of the battery cells can be used as a power source for driving motors such as in a hybrid automobile.

The secondary battery can be fabricated into various shapes, such as cylindrical and prismatic shapes, and includes an electrode assembly (or a jelly roll) comprising a bar of sheet-shaped positive and negative electrodes and an insulator separator interposed between them, the electrodes and separator being wound and inserted into a case. The case includes a cap assembly has an outer terminal to form a battery.

Each of the positive and negative electrodes is provided with a conductive lead element to pass a current generated during a cell operation. The lead elements pass the current generated in the positive and negative electrodes to a positive terminal and a negative terminal.

When the electrode assembly is integrated with the lead elements which connects the electrode assembly to the external terminals, it is hard to output a voltage generated in each part of the electrode assembly, and a potential difference is caused between the area where the electrode assembly is welded to the lead element and the area apart from the welding area. The potential difference degrades the area where the electrode assembly is welded to the lead element and the extent of the degradation becomes greater as the charging and discharging of the battery is repeated. Consequently, the output of the battery drops and the lifespan of the battery is shortened. The phenomena is even worse in a battery for driving a motor which repeats charging and discharging within a short time.

For this reason, multi-tabs are used as the lead elements in a high-power secondary battery.

The multi-tabs are welded to the current collectors of the positive and negative electrodes, which form the electrode assembly, or they form the multi-tabs as part of the current collectors. This decreases the work efficiency because it requires many workers to manufacture the secondary battery.

Also, since the multi-tab-type lead elements are partially connected to the positive and negative electrodes and pass the current generated at the positive and negative electrodes, it is hard to pass a sufficient current, especially in a motor-driving battery that requires a high output power. Thus, the multi-tab-type lead elements are highly likely to degrade the properties of the battery.

SUMMARY OF THE INVENTION

In order to achieve the problems described above, it is an aspect of the present invention to provide a secondary battery with an increased current generating efficiency by improving a lead element and a structure combining the lead element with an electrode assembly.

To achieve the aspects, the present invention provides a secondary battery comprising: an electrode assembly including a positive electrode, a negative electrode, and a separator interposed between the positive electrode and the negative electrode; a case adapted to house the electrode assembly; a cap assembly adapted to be attached to the case to seal the case, the cap assembly including at least one terminal exposed outside of the case; and at least one lead element adapted to electrically connect the electrode assembly to the at least one terminal; wherein the electrode assembly includes an uncoated region having an absence of an active material; and wherein the at least one lead element has a configuration corresponding to that of the uncoated region and is closely affixed to the uncoated region.

The at least one terminal preferably comprises a positive terminal and a negative terminal.

The positive and negative electrodes respectively preferably comprise uncoated regions and the uncoated regions of the positive and negative electrodes are preferably arranged in multi-layers facing each other, and the positive and negative terminals are respectively preferably connected to an outermost portion of the uncoated region of the positive electrode and an outermost portion of the uncoated region of the negative electrode.

The at least one lead element preferably contacts the uncoated region along a length direction of the uncoated region and is electrically connected to the uncoated region.

One terminal and one of the at least one lead elements are preferably integrally formed as one body.

One terminal is preferably arranged in an aperture arranged in a base plate of a cap assembly and connected thereto and a stop protrusion is preferably arranged between the terminal and the at least one lead element and adapted to connect them together and to stop the terminal at the base plate.

The secondary battery preferably further comprises a gasket arranged between the terminal and the base plate and adapted to electrically insulate them from each other.

The secondary battery preferably further comprises a screw thread for fastening a nut arranged on an external circumferential surface of the terminal and adapted to fix the terminal to the base plate.

The at least one lead element preferably comprises a first lead region having a receiving groove adapted to receive a curved surface of the uncoated region.

The at least one lead element preferably further comprises a second lead region adapted to be closely affixed to a flat region of the uncoated region.

The first lead region preferably has a greater width than that of the second lead region.

The secondary battery preferably comprises a prismatic battery.

The secondary battery is preferably adapted to drive a motor.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Exemplary embodiments of the present invention are described in detail below with reference to the accompanying drawings. However, the present invention includes other various possible embodiments and is not limited to the exemplary embodiments described herein.

Figure 1:
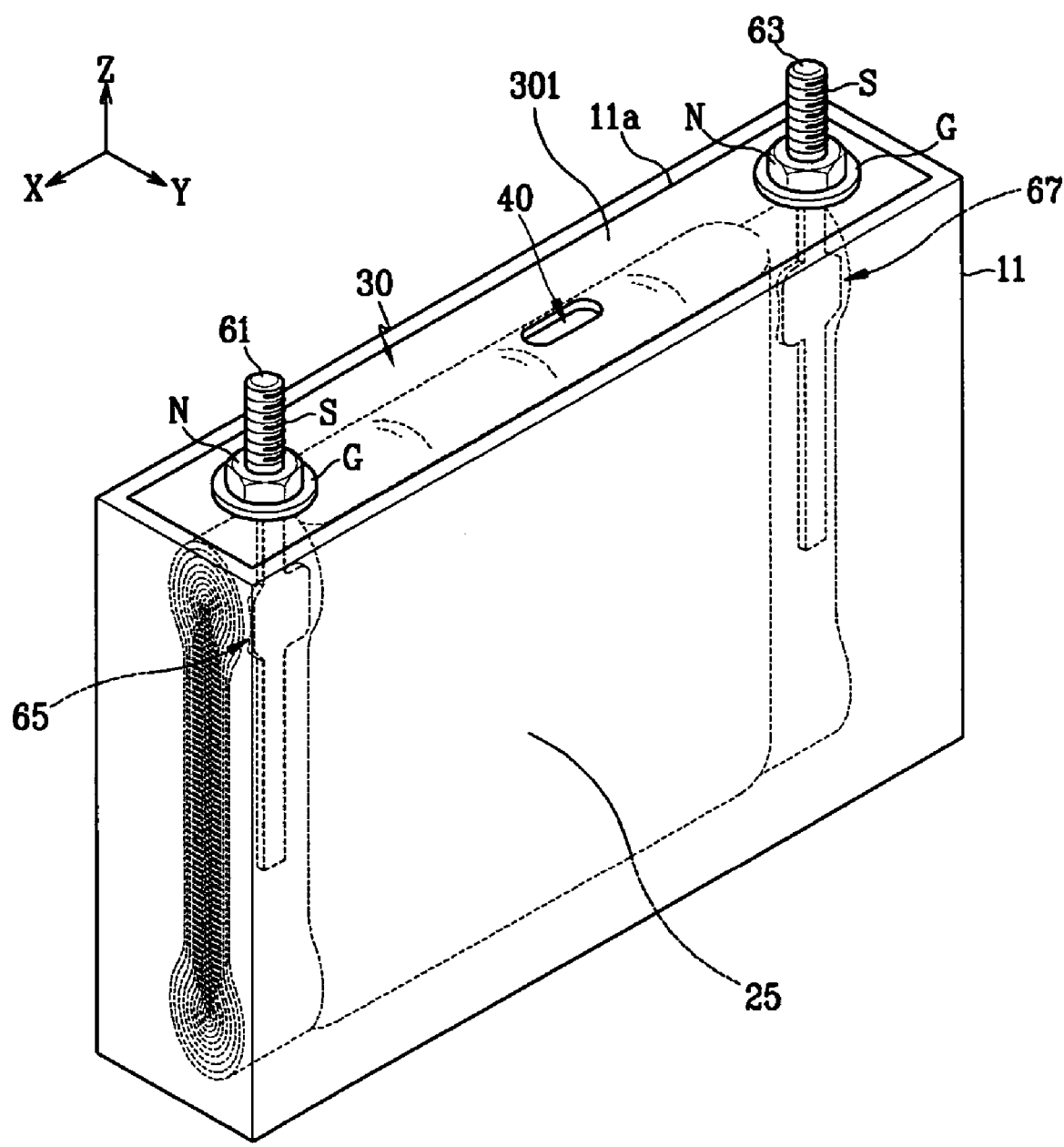
FIG. 1 is a perspective view of a secondary battery in accordance with an embodiment of the present invention.
Figure 2:
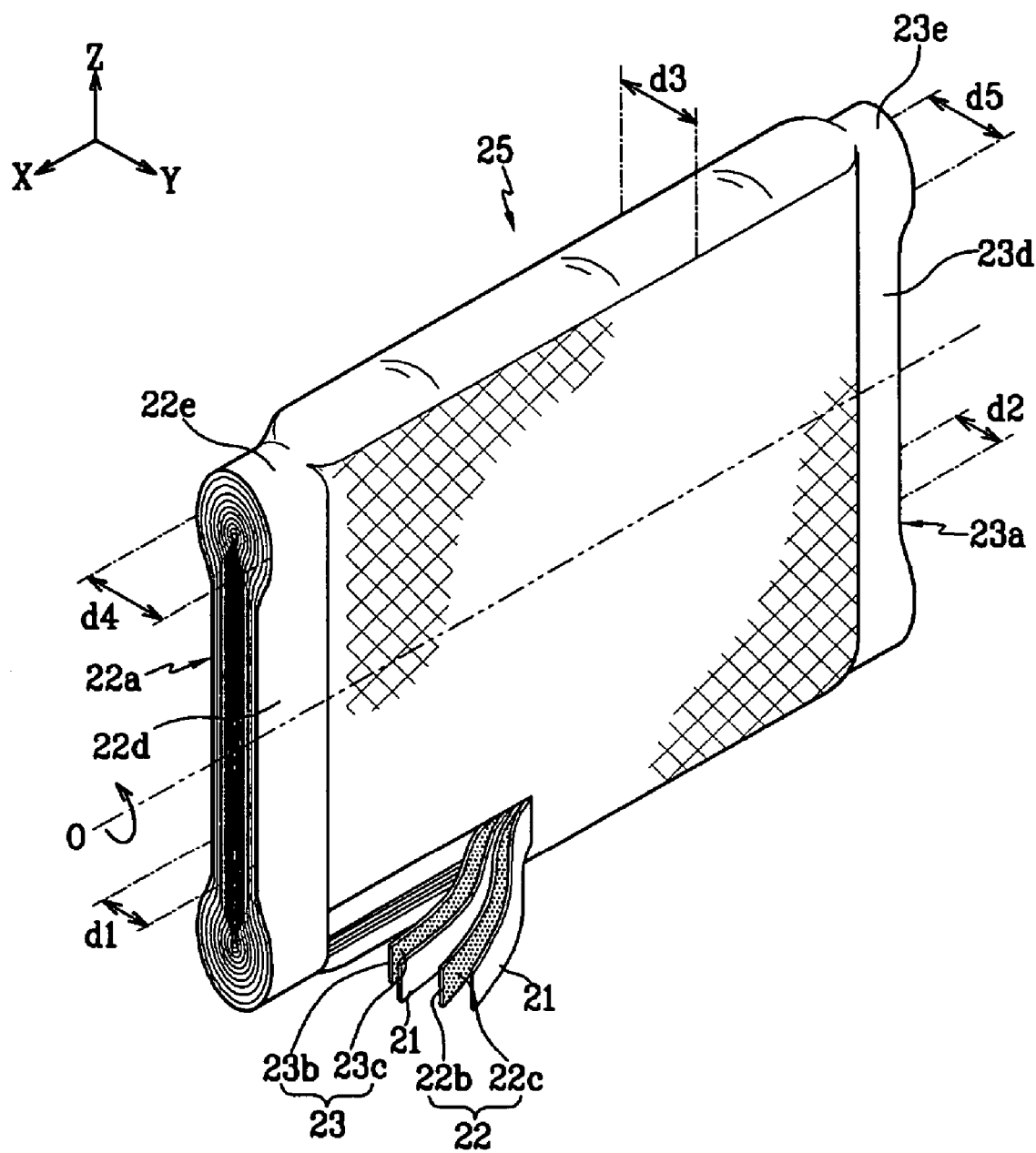
FIG. 2 is a perspective view of an electrode assembly in accordance with the embodiment of the present invention.

FIG. 1 is a perspective view of a secondary battery in accordance with an embodiment of the present invention, and FIG. 2 is a perspective view of an electrode assembly according to an embodiment of the present invention.

Referring to FIGS. 1-2, the secondary battery in accordance with the embodiment of the present invention is a prismatic battery fabricated by inserting an electrode assembly 25, which includes an positive electrode 22, a negative electrode 23 and an insulating separator 21 interposed between the positive electrode 22 and the negative electrode 23, in a case 11 having a hexahedral-shape which is long in an X-axis direction of the drawing and a part of which is open, and sealing the open part of the case 11 with a cap assembly 30.

The case 11 is formed of a conductive metal such as aluminum, an aluminum alloy or a nickel-plated steel. It is formed in a hexahedral shape having an opening through which the electrode assembly 25 can be inserted. However, the case 11 of the present invention is not limited to the hexahedral shape.

The electrode assembly 25 is formed by interposing the separator 21 between the positive electrode 22 and the negative electrode 23 and winding them in a jelly-roll configuration with respect to a winding axis (O). After the electrode assembly 25 is wound in the jelly-roll form, it is pressed and finally formed to be plate shaped.

In both ends of the electrode assembly 25, an uncoated region 22a of a positive electrode and an uncoated region 23a of negative electrode are placed facing each other. Since the electrode assembly 25 is formed in the jelly-roll configuration, it has a form where the uncoated region 22a of the positive electrode and the uncoated region 23a of the negative electrode are arranged in multi-layers.

The uncoated regions 22a and 23a are portions where corresponding active materials 22c and 23c are not present along an edge of a positive current collector 22b and a negative current collector 23b in one side.

The thicknesses d1 and d2 of the uncoated regions 22a and 23a is partially thinner than the entire thickness d3 of the electrode assembly 25 (FIG. 2). The regions having the thickness d1 and d2 of the uncoated regions 22a and 23a (hereinafter, referred to as flat regions) are portions where uncoated regions 22a and 23a are close each other to improve current efficiency.

For forming the flat region, remaining portions (hereinafter, referred to as curved regions) of the uncoated region 22a and 23a have a curve shape having thickness d4 and d5 that is thicker than the thickness d1 and d2.

The cap assembly 30 includes a base plate 301 welded to the opening 11a of the case 11 to seal the case 11.

A positive terminal 61 and a negative terminal 63 are fixed to the base plate 301 while exposing a part thereof outside the case 11.

A screw thread (S) is formed on the outer circumference surface of the positive terminal 61 and the negative terminal 63, and can be fixed to the base plate 301 by a nut N fastening to the screw thread (S) while interposing a gasket G between the base plate 301 and the nut N.

The base plate 301 can further include a vent member 40 and an electrolyte injection hole.

A positive lead element 65 and a negative lead element 67, which are respectively in contact with and assembled with the positive uncoated region 22a and the negative uncoated region 23a, are connected to the positive terminal 61 and the negative terminal 63.

In the present invention, the positive and negative terminals 61 and 63 and the positive and negative uncoated region 22a and 23a are formed to be connected directly or by separate connection member. In the present embodiment, they are connected directly to integrally form one body.

In the present embodiment, the positive and negative terminals 61 and 63 and the positive and negative lead elements 65 and 67 are formed to be symmetrical to each other.

Figure 3:
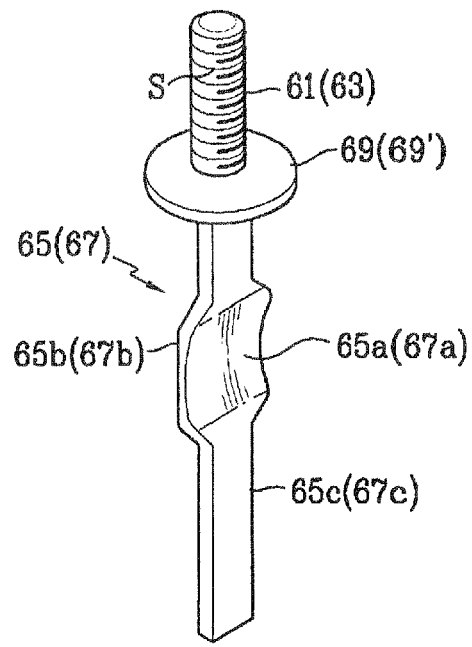
FIG. 3 is a perspective view of a terminal and lead element of the secondary battery in accordance with the embodiment of the present invention.

FIG. 3 is a perspective view of the positive and negative terminals 61 and 63 and the positive and negative lead elements 65 and 67. FIG. 3 shows the positive and negative terminals 61 and 63 and the positive and negative lead elements 65 and 67 in one drawing for convenience of drawing, and accordingly, the positive and negative terminals 61 and 63 and the positive and negative lead elements 65 and 67 are described together as follows.

With reference to the FIG. 3, the positive terminal 61 and the negative terminal 63 have a cylindrical shape with a predetermined height, and the screw thread (S) is formed on the outer circumference surface thereof as mentioned above. The length of the terminals 61 and 63 is sufficient if, when several secondary batteries are gathered to form a battery module, it enables any connection members for electrically connecting the batteries to be fastened to the terminals 61 and 63 while the terminals 61 and 63 are positioned inside and outside the case 11.

Figure 4:
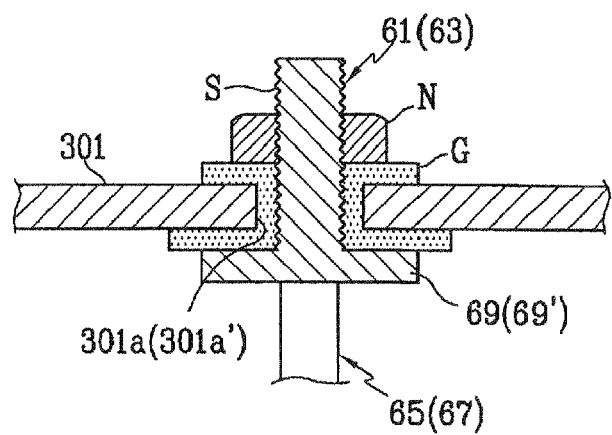
FIG. 4 is a cross-sectional view of a terminal assembled on a base plate of a cap assembly in accordance with the embodiment of the present invention.

The positive lead element 65 and the negative lead element 67 of a bar shape are connected to one sides of the positive terminal 61 and the negative terminal 63, and stop protrusions 69 and 69' of a disk shape are formed between the terminals 61 and 63 and the lead elements 65 and 67. The stop protrusions 69 and 69' stop the positive terminal 61 and the negative terminal 63 at a predetermined position of the base plate 301 by hanging them at the base plate 301 when the positive terminal 61 and the negative terminal 63 are inserted in holes 301a and 301'a (FIG. 4).

For this purpose, the stop protrusions 69 and 69' are composed of a disk shaped member with a larger diameter than the holes 301a and 301'a.

The lead elements 65 and 67 are disposed inside the case 11 and in contact with the positive uncoated region 22a and the negative uncoated region 23a to electrically connect the terminals 61 and 63 and the electrode assembly 25. The lead elements 35 and 37 are closely in contact with and connected to the outermost portions of the positive uncoated region 22a and the negative uncoated region 23a by welding.

When the terminals 61 and 63 and the lead elements 65 and 67 with the above structure are electrically connected to the electrode assembly 25, they meet the following conditions in the present embodiment.

The lead elements 65 and 67 are composed of bar shaped conductive members which contact the outmost portions of the positive uncoated region 22a and the negative uncoated region 23a along the length direction of the uncoated regions.

In the present embodiment, the lead elements 65 and 67 include first lead regions 65b and 67b having receiving grooves 65a and 67a, and second lead regions 65c and 67c connected to the first lead regions 65b and 67b.

Curved regions 22e and 23e of the uncoated regions 22a and 23a are inserted in the receiving grooves 65a and 67a of the first lead regions 65b and 67b to contact to receiving grooves 65a and 67a either completely or partially. The shapes of the receiving grooves 65a and 67a corresponds to outer shape of curved region 22e and 23e.

The second lead regions 65c and 67c have a flat shape to contact flat regions 22d and 23d of the uncoated regions 22a and 23a.

The lead elements 65 and 67 as above can closely be affixed to the outer configuration of the positive and negative uncoated regions 22a and 23a when they contact uncoated regions 22a and 23a, and can prevent a decrease in the current collecting efficiency caused by an increase in contact resistance.

In the prior art, a lead element which contacts an uncoated region is generally flat regardless of the outer configuration of an uncoated region of an electrode assembly, a portion of the lead element which contacts a curved region of uncoated region cannot closely contact the uncoated region and the contact is partially loose. As a result, the contact resistance increases at the portion when actually collecting current and the current collecting efficiency is thereby decreased.

In the present embodiment, the above element has a structure which enlarges the contact area between the lead element and the curved region of the uncoated regions and prevents the above phenomena.

Figure 5:
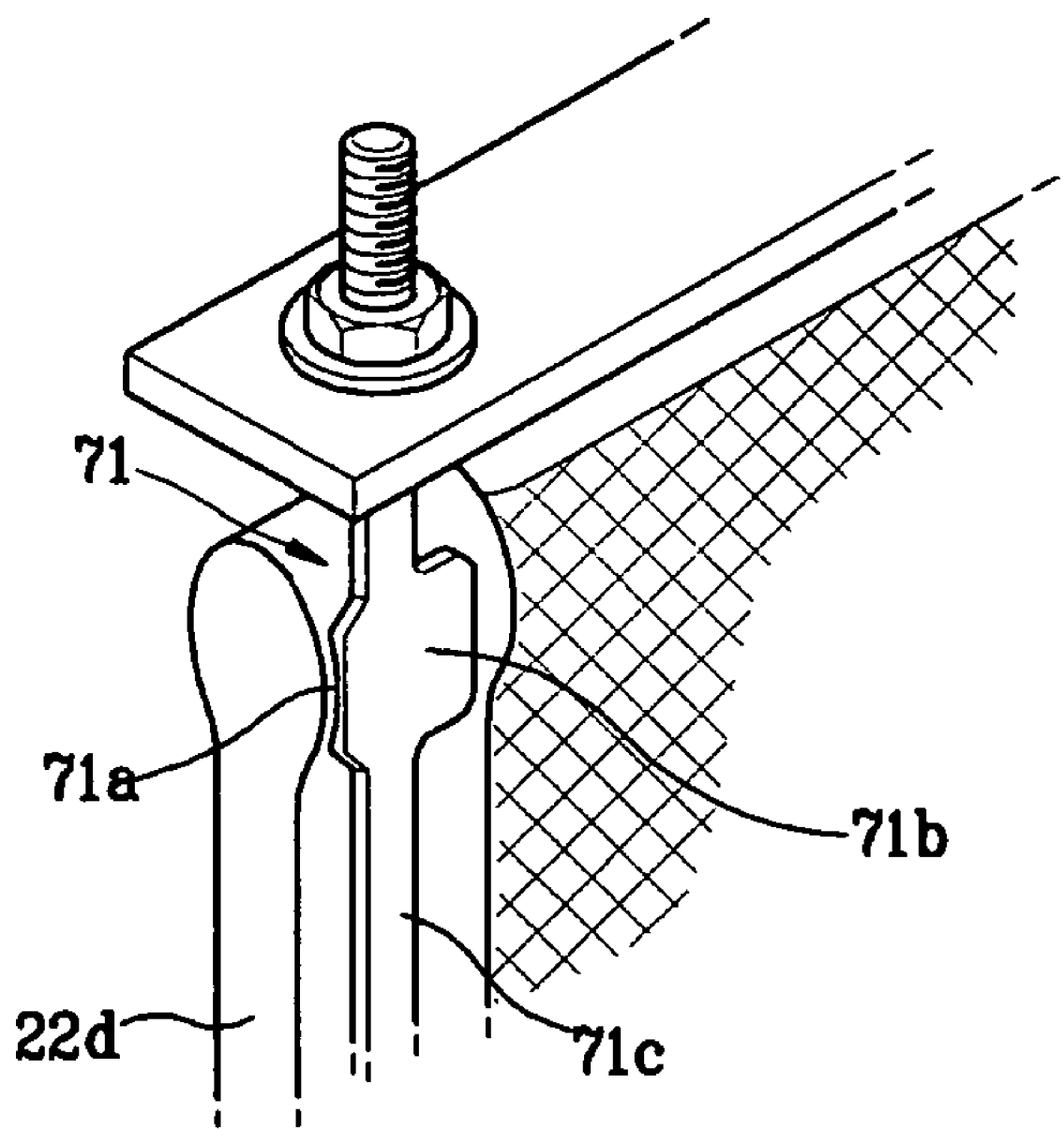
FIG. 5 is a perspective view of a secondary battery in accordance with another embodiment of the present invention.
Figure 6A:
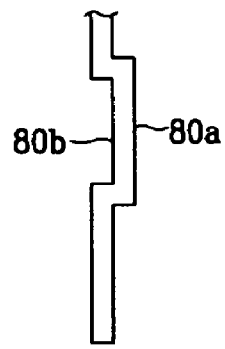
FIGS. 6A to 6E are views of lead elements in accordance with modified embodiments of the present invention.
Figure 6B:
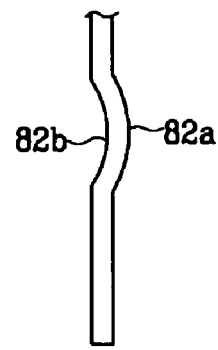
Figure 6C:
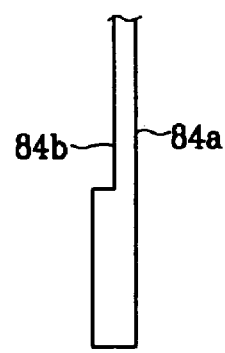
Figure 6D:
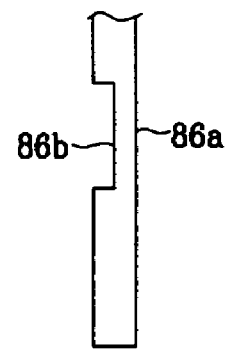
Figure 6E:
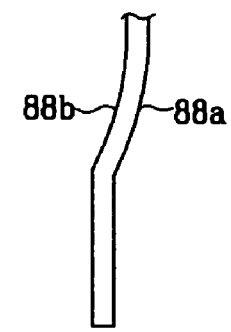

FIG. 5 is a view of another embodiment of the present invention where a lead element 71 has a first lead region 71b enlarged to have a greater width than that of a second lead region 71c.

In this embodiment, when the first lead region 71b contacting the curved region 22e of the uncoated region 22a makes the curved region 22e partially contact its receiving groove 71a, thus decreasing its contact area, the enlarged first lead region contacts the curved region 22e of the curved region 22a still more and thus compensates for the decrease of the contact area. In FIG. 5, the positive lead element 71 connected to the positive uncoated region 22a is illustrated for convenience. However, the structure of the lead element can also be applied to the negative electrode.

FIGS. 6A to 6E are views of lead elements in accordance with modified embodiments of the present invention. As shown in FIGS. 6A to 6E, the receiving grooves 80b, 82b, 84b, 86b, and 88b of the first lead regions 80a, 82a, 84a, 86a, and 88a can be formed in various shapes according to the structure of the first lead regions 80a, 82a, 84a, 86a, and 88a.

As described above, the structure of the lead element according to the present embodiment improves the current collecting efficiency.

The secondary battery according to the exemplary embodiments can be useful as an energy source for driving a motor which is used for Hybrid Electric Vehicles (HEVs), Electric Vehicles (EVs), cordless vacuum cleaners, motorbikes, and motor scooters which require high power performance.

While the present invention has been described in detail with reference to exemplary embodiments, those skilled in the art will appreciate that various modifications and substitutions can be made thereto without departing from the spirit and scope of the present invention as set forth in the appended claims.

What is claimed is:

1. A secondary battery, comprising:
   an electrode assembly including a positive electrode, a negative electrode, and a separator interposed between the positive electrode and the negative electrode, said electrode assembly having at least one curved end region and a flat middle region connected to said at least one curved region in which said at least one curved end region is wider than said flat middle region;
   a case adapted to house the electrode assembly;
   a cap assembly adapted to be attached to the case to seal the case, the cap assembly including at least one terminal exposed outside of the case; and
   at least one lead element adapted to electrically connect the electrode assembly to the at least one terminal;
   wherein the electrode assembly includes an uncoated region in said at least one curved end region and said flat middle region having an absence of an active material; and
   wherein the at least one lead element has a configuration corresponding to that of the uncoated region and is adapted to be closely affixed to and following the contour of the uncoated region of both said at least one curved end region and said flat middle region.

2. The secondary battery of claim 1, wherein the at least one terminal comprises a positive terminal and a negative to urinal.

3. The secondary battery of claim 2, wherein the positive and negative electrodes respectively comprise uncoated regions and wherein the uncoated regions of the positive and negative electrodes are arranged in multi-layers facing each other, and wherein the positive and negative terminals are adapted to be respectively connected to an outermost portion of the uncoated region of the positive electrode and an outermost portion of the uncoated region of the negative electrode.

4. The secondary battery of claim 1, wherein the at least one lead element is adapted to contact the uncoated region along a length direction of the uncoated region and to be electrically connected to the uncoated region.

5. The secondary battery of claim 1, wherein one terminal and one of the at least one lead elements are adapted to be integrally formed as one body.

6. The secondary battery of claim 1, wherein one terminal is arranged in an aperture arranged in a base plate of the cap assembly and connected thereto and wherein a stop protrusion is arranged between the one terminal and the at least one lead element and is adapted to connect them together and to stop the one terminal at the base plate.

7. The secondary battery of claim 6, further comprising a gasket arranged between the one terminal and the base plate and adapted to electrically insulate the one terminal from the base plate.

8. The secondary battery of claim 6, further comprising a screw thread adapted to fasten a nut arranged on an external circumferential surface of the terminal and to fix the one terminal to the base plate.

9. The secondary battery of claim 1, wherein the at least one lead element comprises a first lead region having a receiving groove adapted to receive a curved surface of the uncoated region.

10. The secondary battery of claim 9, wherein the at least one lead element further comprises a second lead region adapted to be closely affixed to a flat region of the uncoated region.

11. The secondary battery of claim 10, wherein the first lead region has a greater width than that of the second lead region.

12. The secondary battery of claim 1, wherein the secondary battery comprises a prismatic battery.

13. The secondary battery of claim 1, wherein the secondary battery is adapted to drive a motor.

* * * * *